(12) United States Patent
Chairat et al.

(10) Patent No.: US 8,563,078 B2
(45) Date of Patent: Oct. 22, 2013

(54) METHOD OF FABRICATING A PAINTED SUBSTRATE THAT IS ELECTRICALLY NON-CONDUCTIVE

(75) Inventors: Claire Chairat, Salon de Provence (FR); Olivier Burel, Bouc Bel Air (FR); Jean-Marc Berthier, Lambesc (FR)

(73) Assignee: Eurocopter, Marignane Cedex (FR)

( * ) Notice: Subject to any disclaimer, the term of this patent is extended or adjusted under 35 U.S.C. 154(b) by 263 days.

(21) Appl. No.: 12/993,165

(22) PCT Filed: May 14, 2009

(86) PCT No.: PCT/FR2009/000571
§ 371 (c)(1), (2), (4) Date: Mar. 8, 2011

(87) PCT Pub. No.: WO2009/150317
PCT Pub. Date: Dec. 17, 2009

(65) Prior Publication Data
US 2011/0151133 A1    Jun. 23, 2011

(30) Foreign Application Priority Data
May 19, 2008    (FR) ...................... 08 02677

(51) Int. Cl.
*B05D 1/08* (2006.01)
*B05D 1/36* (2006.01)
*B29C 41/00* (2006.01)

(52) U.S. Cl.
USPC ............................ 427/133; 427/475; 264/446

(58) Field of Classification Search
USPC .................................. 427/133, 475; 264/446
See application file for complete search history.

(56) References Cited

U.S. PATENT DOCUMENTS

| 4,681,712 A * | 7/1987 | Sakakibara et al. .......... 264/440 |
| 6,896,834 B2 | 5/2005 | Packer et al. |
| 2003/0049413 A1 | 3/2003 | Packer et al. |

FOREIGN PATENT DOCUMENTS

| FR | 2247337 A | 5/1975 |
| GB | 1479194 A | 7/1977 |
| WO | 9406611 A1 | 3/1994 |

OTHER PUBLICATIONS

International Search Report; Application No. WO 2009/150317; dated Dec. 17, 2009.
Chinese First Office Action Dated Dec. 12, 2012, Applicant EUROCOPTER, Application No. 200980118465.4.

* cited by examiner

*Primary Examiner* — Frederick Parker
(74) *Attorney, Agent, or Firm* — Brooks Kushman P.C.

(57) ABSTRACT

The present invention relates to a method of fabricating a painted substrate (30) using powder paint (21). The substrate is electrically insulating. The method includes the following steps performed in succession: a) a treatment coating (10) is placed on a mold (1), the treatment coating (10) includes at least one preparation layer having a release agent (15, 15') in contact with the mold (1); b) the treatment coating (10) is electrostatically covered with powder paint (21) in such a manner that the powder paint (21) is attracted towards the mold (1) and is held against the treatment coating (10); c) the powder paint (21) is transformed at least in part in order to obtain a layer (20) of powder paint (21); and d) the substrate (30) is prepared on the layer (20) of powder paint to form the painted substrate.

18 Claims, 1 Drawing Sheet

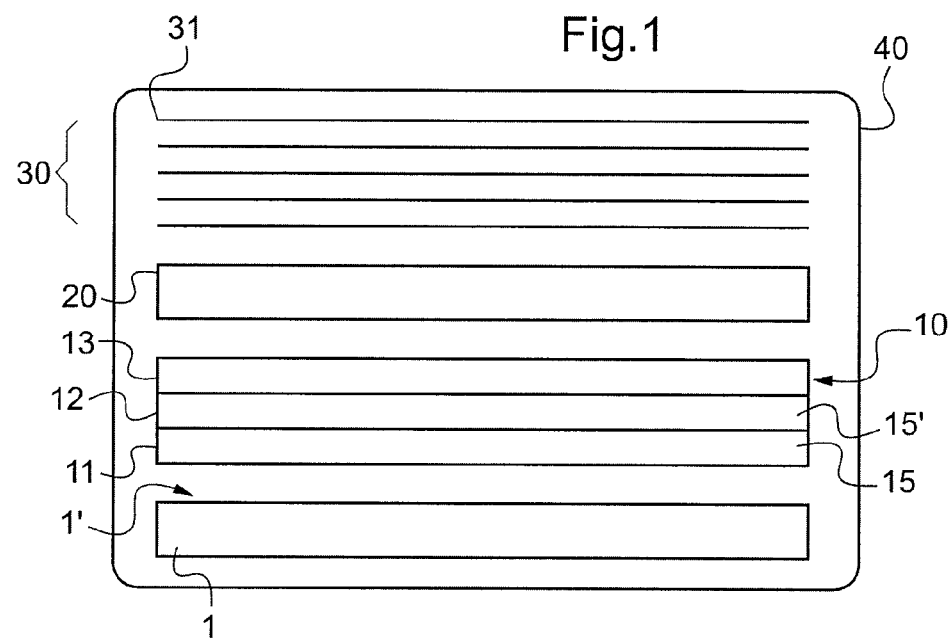
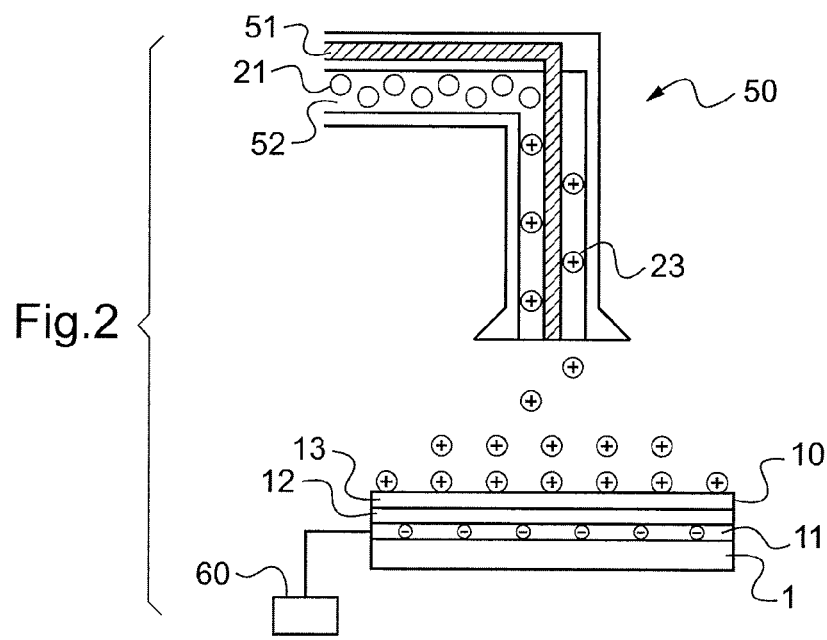
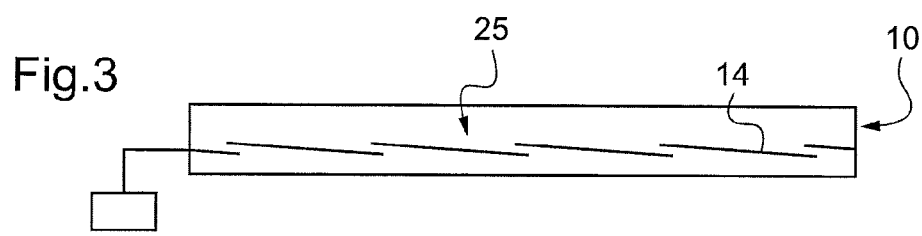

METHOD OF FABRICATING A PAINTED SUBSTRATE THAT IS ELECTRICALLY NON-CONDUCTIVE

FIELD OF THE INVENTION

The present invention relates to a method of fabricating a painted substrate that is electrically non-conductive, i.e. an insulating substrate made of plastics or composite materials.

The invention thus lies in the narrow field of methods of painting non-metallic parts that are electrically non-conductive, and more particularly substrates of plastics or composite materials.

BACKGROUND OF THE INVENTION

Usually, a paint comprises three components, namely a pigment, a binder, and a solvent.

The pigment provides the color, appearance, opaqueness, and certain special properties of the paint, the binder is a macromolecular substance for bonding together the pigments and fillers for keying the paint on the substrate, and the solvent serves to dissolve the binder and to facilitate application of the paint by adjusting the viscosity and the rate of evaporation of said solvent. Once deposited on the substrate that is to be painted, the solvent evaporates and the paint polymerizes or is transformed by chemical bonding.

Unfortunately, the solvents used generally include volatile organic components that are dangerous for humans and the environment. Environmental standards are becoming ever more stringent, so it is appropriate to use paints that are not polluting.

It is then possible to envisage using paints in which the solvent is water. Nevertheless, such paints sometimes contain additives, of the glycol ether type, that are harmful for the environment.

Consequently, another type of paint has been implemented, namely powder paints. Powder paints are powdery materials in the form of thermoplastic or thermosetting powders that do not contain any solvents.

The powder paint is then deposited on the substrate for painting and the powder is then transformed into a layer of paint by a thermal effect, e.g. by baking in an oven. When the substrate for painting is a metal, the person skilled in the art charges the powder paint electrically and then applies it to the substrate for painting. The substrate is electrically charged with a polarity opposite to that of the powder paint, so the paint powder is attracted towards the substrate and adheres thereto temporarily.

Then, by heating the powder paint, e.g. by stoning, the powder paint is caused to melt and then to harden so as to form a layer of paint covering the substrate.

That method is very effective, but it is unsuitable as it stands for use with electrically non-conductive substrates, i.e. substrates made of thermosetting composite materials, or thermoplastic materials, for example, or indeed plastics type materials.

Furthermore, the method requires the substrate for painting to be held by an end of its outside surface. That method is therefore unsuitable for parts that do not have any surface that can be left unpainted, or parts that are to be completely covered in paint.

In a first method of applying powder paint on an electrically non-conductive material, a conductive material, e.g. graphite, is included in the substrate for painting in order to improve its conductivity.

In a second method, the substrate is covered in an electrically conductive primer layer. The powder paint can then adhere to the substrate via its primer layer.

That method satisfies requirements by enabling non-polluting powder paint to be used on a substrate that is electrically non-conductive.

Nevertheless, the primer layer used may itself possibly be harmful for the environment. In addition, the primer layer imparts an electrically conductive nature to the substrate for painting, and this characteristic may be unacceptable, depending on the use to which the substrate is to be put.

Consequently, a third method is known seeking to remedy that drawback by avoiding giving an electrically conductive nature to a substrate that is to remain electrically neutral.

According to document EP 0 927 082, an electrically conductive primer layer is applied to the substrate for painting, e.g. using a spray gun, and it is then covered in powder paint.

A heating cycle is then performed serving to bake the powder paint. In addition, because of the nature of the primer layer, the painted substrate returns to being non-conductive at the end of the heating cycle.

Although effective, it is found that that third method still requires the use of primer layers.

Furthermore, document FR 2 180 676 presents a method of varnishing a molded part, and document EP 0 698 476 relates to applying a coating referred to as a "gel-coat" on a molded composite sheet. Those documents are thus remote from the invention.

SUMMARY OF THE INVENTION

An object of the present invention is thus to propose a method of painting that avoids the above-mentioned limitations, the painting method not making use of substances that are harmful for the environment.

According to the invention, a method of fabricating an electrically insulated painted substrate is remarkable in that the following steps are performed in succession:

a) placing a treatment coating provided with an electrically conductive element on a mold, the treatment coating comprising at least one preparation layer having a release agent in contact with the mold;

b) electrostatically covering the treatment coating with powder paint in such a manner that the powder paint is attracted to the mold and is held against the treatment coating;

c) transforming the powder paint at least in part in order to obtain a sheet of paint, i.e. a layer of paint that is pre-hardened and uniform; and d) preparing the substrate, i.e. the body of the substrate, on the layer in order to obtain the painted substrate.

Surprisingly, the powder paint hardens and adheres well to the substrate, chemical bonds being created between the powder paint and the substrate.

It should be observed that the method of the invention does not imply using a conductive primer layer between the electrically non-conductive substrate and the powder paint.

The invention goes against prejudices that have previously been dominant by applying the powder paint against the treatment coating of a mold and not against the substrate for painting, which, at first glance, appears nonsensical. In the invention, a painted substrate is made by preparing the substrate directly on a layer of paint, instead of making the substrate and then painting it.

This preparation of the substrate directly on a layer of paint is original and innovative. The invention provides a method of fabricating a painted substrate as such, in contrast to the methods suggested by documents FR 2 180 676 and EP 0 698 476.

The absence of an electrically conductive primer layer and the absence of paint including solvent guarantees minimal impact on the environment.

Furthermore, the absence of an electrically conductive primer layer minimizes the weight of the painted substrate to a greater or lesser extent, depending on the dimensions of the substrate.

Finally, it should be observed that the method considerably reduces the substrate fabrication cycle by eliminating a step dedicated to the painting stage. The financial savings that result therefrom are not negligible.

Furthermore, the invention guarantees that the entire substrate is painted, since the substrate is not held by any of its ends in order to be painted.

The invention may also include one or more of the following additional characteristics.

The powder paint may form part of the thermoplastic or thermosetting group of powder paints, and may for example be a paint of the epoxy, polyurethane, polyester, or indeed acrylic type.

In addition, the release agent may be a substance based on silicone, a substance based on solvent, an aqueous substance, a substance of the siloxane type, or indeed a substance without solvent.

Furthermore, during step d), in a first technique, the substrate is optionally prepared by draping pre-impregnated composite-material fabrics on the top of the layer of powder paint.

Thereafter, still during step d), after draping the pre-impregnated fabrics, the assembly comprising the mold, the treatment coating, the layer of paint, and the composite materials of the substrate is heated in order to polymerize it and obtain the painted substrate.

In this way, said assembly is heated to a temperature lying in the range 80° C. to 400° C. so as to transform both the layer of paint and the substrate, e.g. so as to polymerize them.

The composite materials used may comprise composites of the polyester epoxy, bismaleimide, phenolic, thermoplastic, or indeed thermosetting type, together with carbon, glass, aramid, or any other type of textile fibers.

It should be observed that the finished substrate is electrically insulating insofar as it does not conduct electricity. This characteristic is not incompatible with using carbon fibers since the carbon fibers end up being completely embedded in the resin.

In a second technique, during step d), the substrate is prepared by placing fibers onto the layer of paint and then injecting thermosetting or thermoplastic resin that reacts in-situ (a monomer is injected followed by catalyst), or else material is injected in the molten state at a temperature lying in the range 80° C. to 420° C.

The fibers used may be carbon, glass, aramid, or any other textile fiber.

Finally, in a third technique, during step d), the substrate is prepared by injecting plastics materials onto the layer of paint at a temperature lying in the range 80° C. to 500° C.

The physical or chemical transformation implemented during step c), e.g. polymerization, is advantageously performed using conventional heater means of thermal, magnetic, or radiant type, e.g. by heating the mold by induction.

Nevertheless, this transformation that enables a layer of paint to be obtained at least in part from powder paint may be performed using conventional techniques known to the person skilled in the art.

In addition, during step a), it is possible to envisage placing at least one preparation layer based on release agent on the mold and then covering said preparation layer in a finishing layer based on varnish in order to finalize the treatment coating.

Optionally, the powder paint and/or the finishing layer include(s) additives in order to impart particular characteristics to the painted substrate. By way of example, these additives may provide anti-impact, anti-lightning, anti-dirtying, or anti-UV characteristics to the painted substrate.

Advantageously, the treatment coating comprises first and second preparation layers based on release agents, optionally different release agents, and during step a) a first preparation layer of release agent is placed on the mold, and then the first preparation layer of release agent is polymerized before being covered in a second preparation layer of release agent.

Such preparation makes it possible to obtain better quality for the entire layer of release agent in the mold since the thickness and the distribution of the two layers are better controlled than they would be if only a single, thicker layer were to be applied.

The second preparation layer may then be covered in a finishing layer based on varnish in order to finalize the treatment coating.

Furthermore, the treatment coating is provided with an electrically conductive element, and during step b), the electrically conductive element is charged electrically with a first polarity, using the techniques known to the person skilled in the art, and the powder paint charged electrically with a second polarity of opposite sign to the first polarity is projected from the electrically conductive element so that the powder paint is attracted by the mold or by the treatment coating.

Contrary to the usual practice, in the claimed method, the powder paint is attracted to the treatment coating and thus to the mold and not against the substrate for painting.

Once the powder paint has been deposited in stable manner against the treatment coating, the substrate can then be prepared against the powder paint, e.g. by draping pre-impregnated composite material fabrics.

The treatment coating thus includes an electrically conductive element. There is then no longer any need for the mold to be electrically conductive insofar as the treatment coating is electrically charged in order to attract thereto particles of powder paint that have been electrically charged with a polarity opposite to the polarity of the treatment coating.

In a first variant of this second embodiment, at least one preparation layer based on release agent includes an electrically conductive element.

In a second variant of this second embodiment, the treatment coating includes a finishing layer based on varnish that is deposited during step a) on said at least one preparation layer based on release agent of the treatment coating, the varnish-based finishing layer being provided with an electrically conductive element.

Whatever the variant of this second embodiment, the electrically conductive element comprises nanofillers with a thickness on the order of nanometers and a length on the order of micrometers, these nanofillers providing electrical continuity within the treatment coating by a "tiling" effect.

What is meant by a "tilting" effect is that consequently, each piece of nanofiller overlaps an adjacent piece so as to cover it in part, like tiles cover one another in part, so as to constitute a continuous electrically conductive layer within the treatment coating.

This technology makes it possible to have an electrically conductive layer of nanofillers with a thickness that is very small and to obtain additional characteristics such as good sealing.

At least a portion of the treatment coating may be chemically bonded to the powder paint at the end of the method, and this electrically conductive layer of nanofillers may thus cover the painted substrate at the end of said method.

BRIEF DESCRIPTION OF THE DRAWINGS

The invention and its advantages appear in greater detail from the following description of embodiments given by way of illustration with reference to the accompanying figures, in which:

FIG. 1 is a diagrammatic view explaining the method of the invention;

FIG. 2 is a view explaining step b) of the method; and

FIG. 3 is a diagrammatic view showing a treatment coating in a second embodiment.

DETAILED DESCRIPTION OF THE PREFERRED EMBODIMENT

Elements present in more than of the figures are given the same references in each of them.

FIG. 1 is a diagrammatic view for explaining the method of the invention.

Firstly, during a step a), an operator proceeds to place a treatment coating 10 on a mold 1.

Initially, the mold 1 is readied by depositing a first preparation layer 11 of the treatment coating 10 on an inside face 1' of the mold 1.

The first preparation layer is then made using a conventional type of unmolding agent or release agent 15.

Optionally, the treatment coating 10 may also include in succession a second preparation layer 12 of release agent 15' of the usual type. The release agents 15 and 15' of the first and second preparation layers 11, 12 may be different, depending on requirements.

In this configuration, during step a), when the first preparation layer 11 is deposited against the inside face 1' of the mold, the operator heats said first preparation layer 11 in order to transform it, e.g. to polymerize it.

Thereafter, still during step a), the operator applies the second preparation layer 12 against the first preparation layer 11.

Similarly, it is possible to terminate the treatment surface 10 by spreading a finishing layer 13 based on varnish 16 over the first preparation layer 11, or the second preparation layer 12, as appropriate, and as shown in FIG. 1.

At the end of this first step a), the operator has thus deposited a treatment coating 10 on the mold 1.

The operator then performs step b) of the method.

During step b), the operator electrostatically covers the treatment coating 10 with a paint 21 in powder form.

The powder paint 21, attracted by the treatment coating 10, constitutes a surface that is substantially plane.

During a step c), the operator transforms the layer 20 of powder paint completely or partially depending on requirements in order to make it stable.

For example, the operator polymerizes the powder paint by heating it so as to obtain a sheet of paint, i.e. a layer of paint that is at least pre-hardened and uniform.

The layer 20 is then shaped on the mold 1 and therefore has substantially the same shape as the mold 1. Thus, the layer 20 of paint represents a surface on which the operator can prepare the substrate 30 constituting the part for painting.

During a step d) following the at least partial transformation of the powder paint into a layer 20 of paint, the operator sets up the substrate 30 directly on the layer 20. The substrate takes on the shape of the layer 20 of paint and consequently the shape of the mold 1.

In order to make up the substrate in a first technique, the operator drapes a plurality of composite material fabrics 31 on the layer 20 of powder paint 21.

Once draping has been completed, the operator places the assembly comprising the mold 1, the treatment coating 10, the paint layer 20, and the composite materials constituting the substrate 30 in a vacuum bag 40 e.g. so that the fabric 31 and the layer 20 of powder paint 21 take the required shape of the mold 1.

To finish, the operator uses conventional means to heat said assembly comprising the mold 1, the treatment coating 10, the paint layer 20, and the composite materials constituting the substrate 30 up to a temperature lying in the range 80° C. to 400° C.

At the end of step d), the operator unmolds the painted substrate 30, said substrate 30 then being covered in a layer of powder paint.

In a second technique that is not shown in the figure, the operator places fibers, e.g. glass fibers, on top of the layer 20 of paint and then closes the mold 1 with a top shell that has the shape of the substrate that is to be obtained.

Once the mold has been closed, the operator injects hot resin between the layer 20 of paint and said top shell.

On cooling, a painted substrate is obtained, said substrate including fibers embedded in the resin.

In a third technique that is not shown in the figure, the operator closes the mold 1 with a top shell having the shape of the substrate to be obtained, and then injects hot plastics material between the layer 20 of paint and said top shell.

FIG. 2 shows step b) of the method in greater detail.

In order to cover the treatment surface 10 electrostatically, the operator charges an electrically conductive element to a first polarity by connecting it to a static electricity generator 60.

In the embodiment shown in FIG. 2, the treatment coating 10 is provided with said electrically conductive element connected to the static electricity generator 60.

With reference to FIG. 3, the treatment coating 10 includes an electrically conductive element.

Thus, the first preparation layer or the second preparation layer, or indeed the finishing layer, as appropriate, is provided with the electrically conductive element 14.

This electrically conductive element 14 possesses a plurality of electrically conducive nanofillers 25, with any nanofiller 25 partially covering another nanofiller and/or being partially covered by another nanofiller so as constitute the electrically conductive element that is connected to the static electricity generator 60.

With reference to FIG. 2, the powder paint 21 is projected using a paint gun 50.

The paint gun 50 has an electrical power supply 51 and a feed duct 52 for the electrically neutral particles 22 of powder paint.

Under the effect of the magnetic field that results from the electrical power supply 51, the particles become electrically charged with a second polarity of opposite sign to said first polarity.

Thus, paint particles 23 that are charged with a second polarity, e.g. a positive polarity, are expelled from the gun 50 and are attracted by the electrically conductive element of the treatment coating 10 that is electrically charged with a first polarity of sign opposite to that to the second polarity, i.e. negative polarity in this example.

Consequently, these particles 23 charged with a second polarity become deposited and held against the treatment coating 10.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

The invention claimed is:

1. A method of fabricating an electrically insulating substrate painted with powder paint, said method comprising the following steps performed in succession:
   a) placing a treatment coating comprising an electrically conductive material on a mold, said treatment coating further comprising a first preparation layer comprising a release agent in contact with said mold;
   b) electrostatically covering said treatment coating with powder paint in such a manner that said powder paint is attracted to said mold and is held against the treatment coating;
   c) heating said powder paint at least in part in order to obtain a powder paint layer; and
   d) preparing said electrically insulating substrate on said paint layer to form said electrically insulating substrate painted with powder paint.

2. A method according to claim 1, wherein said treatment coating further comprises a varnish finishing layer, said first preparation layer being placed on said mold and then covered by said varnish finishing layer.

3. A method according to claim 1, wherein said treatment coating further comprises a second preparation layer comprising a release agent, said first preparation layer being placed on said mold, then polymerized, and then covered by said second preparation layer.

4. A method according to claim 1, wherein during step b), said electrically conductive material is charged electrically with a first polarity and the powder paint being charged electrically with a second polarity of opposite sign to the first polarity is projected towards said mold so that said powder paint is attracted towards said treatment coating.

5. A method according to claim 3, wherein said first preparation layer includes said electrically conductive material.

6. A method according to claim 1, wherein said treatment coating includes a varnish finishing layer placed on said first preparation layer of the treatment coating during step a), and said varnish finishing layer includes said electrically conductive material.

7. A method according to claim 4, wherein said electrically conductive material comprises nanofillers having thicknesses on the order of nanometers and lengths on the order of micrometers, said nanofillers being arranged in an overlapping manner to provide electrical continuity within said treatment coating.

8. A method according to claim 1, wherein during step d), said substrate is prepared by placing pre-impregnated composite-material fabrics on said powder paint layer.

9. A method according to claim 8, wherein during step d), after placing said pre-impregnated composite material fabrics, an assembly comprising the mold, the treatment coating, the powder paint layer, and the pre-impregnated composite material fabric of the substrate is heated to cause polymerization to form said substrate painted with powder paint.

10. A method according to claim 9, wherein during step d), heating is performed to a temperature in the range 80° C. to 400° C.

11. A method according to claim 1, wherein during step d), said substrate is prepared by placing fibers over said powder paint layer and then injecting resin.

12. A method according to claim 1 wherein during step d), said substrate is prepared by injecting plastics materials onto said powder paint layer on said mold.

13. A method of fabricating an electrically insulating substrate painted with powder paint, said method comprising the following steps performed in succession:
   a) placing an electrically conductive treatment coating on a mold, said treatment coating comprising an electrically conductive material and a release agent;
   b) activating the electrically conductive material and a powder paint to electrostatically attract the powder paint towards the treatment coating in such a manner that the powder paint electrostatically covers and is held against the treatment coating;
   c) heating the powder paint to form a paint layer; and
   d) preparing the electrically insulating substrate on the paint layer to form the electrically insulating substrate painted with powder paint, wherein during step d), the substrate is prepared by placing pre-impregnated composite-material fabrics on the powder paint layer and curing the fabrics.

14. A method according to claim 13, wherein during step b), the electrically conductive material is charged electrically with a first polarity and the powder paint is charged electrically with a second polarity of opposite sign to the first polarity, the electrically charged powder paint is then projected towards the mold so that the powder paint is attracted towards the treatment coating.

15. A method according to claim 14, wherein the electrically conductive material comprises nanofillers having thicknesses on the order of nanometers and lengths on the order of micrometers, the nanofillers being arranged in an overlapping manner to provide electrical continuity within the treatment coating.

16. A method of fabricating an electrically insulating substrate painted with powder paint, said method comprising the following steps performed in succession:
   a) placing a treatment coating comprising an electrically conductive material on a mold, the treatment coating further comprising a first preparation layer comprising a release agent in contact with the mold;
   b) electrostatically covering the treatment coating with powder paint in such a manner that the powder paint is attracted towards the mold and is held against the treatment coating;
   c) heating the powder paint at least in part in order to obtain a paint layer; and
   d) preparing the electrically insulating substrate on the paint layer to form the electrically insulating substrate painted with powder paint, wherein during step d), the substrate is prepared by placing fibers over the paint layer and then injecting resin over the fibers.

17. A method according to claim 16, wherein during step b), the electrically conductive material is charged electrically with a first polarity and the powder paint is charged electrically with a second polarity of opposite sign to the first polarity, the electrically charged powder paint is then projected towards the mold so that the powder paint is attracted towards the treatment coating.

18. A method according to claim 17, wherein the electrically conductive material comprises nanofillers having thicknesses on the order of nanometers and lengths on the order of micrometers, the nanofillers being arranged in an overlapping manner to provide electrical continuity within the treatment coating.

* * * * *